United States Patent
Aoki et al.

(10) Patent No.: US 6,556,421 B2
(45) Date of Patent: Apr. 29, 2003

(54) TEMPERATURE-COMPENSATING THIN-FILM CAPACITOR AND ELECTRONIC DEVICE

(75) Inventors: Masahiro Aoki, Miyagi-ken (JP); Makoto Sasaki, Miyagi-ken (JP); Hitoshi Kitagawa, Miyagi-ken (JP); Hirofumi Fukui, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/028,543

(22) Filed: Dec. 19, 2001

(65) Prior Publication Data

US 2002/0122285 A1 Sep. 5, 2002

(30) Foreign Application Priority Data

Dec. 21, 2000 (JP) ........................................ 2000-389008
Aug. 24, 2001 (JP) ........................................ 2001-254927

(51) Int. Cl.⁷ ................................................ H01G 4/06
(52) U.S. Cl. ................. 361/311; 361/306.1; 361/306.3; 361/303; 361/305; 361/313; 252/62.2
(58) Field of Search .................... 361/306.1, 306.3, 361/311, 301.3, 301.4, 321.4, 321.5, 321, 301.1, 303, 305, 309, 313; 438/692; 252/62.3

(56) References Cited

U.S. PATENT DOCUMENTS

| | | | |
|---|---|---|---|
| 4,548,910 A | | 10/1985 | Irisawa |
| 4,636,908 A | * | 1/1987 | Yoshihara et al. |
| 4,930,044 A | | 5/1990 | Eda et al. |
| 5,311,406 A | * | 5/1994 | Snodgrass et al. |
| 5,685,968 A | * | 11/1997 | Hayakawa et al. |
| 5,723,171 A | * | 3/1998 | Cuchiaro et al. |
| 5,923,524 A | | 7/1999 | Cava |
| 6,153,525 A | * | 11/2000 | Hendricks et al. |
| 6,154,311 A | * | 11/2000 | Simmons, Jr. et al. |
| 6,243,474 B1 | * | 6/2001 | Tai et al. |
| 6,324,048 B1 | * | 11/2001 | Liu |

FOREIGN PATENT DOCUMENTS

JP 63-110618 5/1988

* cited by examiner

*Primary Examiner*—Anthony Dinkins
*Assistant Examiner*—Nguyen Ha
(74) *Attorney, Agent, or Firm*—Beyer Weaver & Thomas LLP

(57) ABSTRACT

A temperature-compensating thin-film capacitor includes a first dielectric thin-film having a specific inductive capacity of 4.0 or less and a linear thermal expansion coefficient of 50 ppm/° C. or more, and includes a second thin-film capacitor having capacitance-temperature coefficient with an absolute value of 50 ppm/° C. or less, in which the first and the second dielectric thin-films are placed between electrodes. The present thin-film capacitor design significantly reduces variations in capacitance due to manufacturing equipment tolerance. Also, miniaturization, thinning, and lightening of the thin-film capacitor is achieved. In another aspect of the invention, an electronic device having the temperature-compensating thin-film is provided. The temperature stability of the present thin-film capacitor is highly advantageous for incorporation into electronic devices such as a portable electronic device, microwave communication equipment.

16 Claims, 8 Drawing Sheets

TEMPERATURE-COMPENSATING THIN-FILM CAPACITOR AND ELECTRONIC DEVICE

BACKGROUND OF THE INVENTION

1. Field of the Invention

The present invention relates to a temperature-compensating thin-film capacitor in which temperature dependence of a junction capacitance of a semiconductor is reduced, and to an electronic device that includes the capacitor having reduced temperature dependence.

2. Description of the Related Art

A thin-film capacitor generally has a structure wherein a lower electrode, a dielectric layer, and an upper electrode are deposited on a substrate. Alternatively, a thin-film capacitor can have a structure wherein a dielectric layer, followed by an upper electrode are sequentially deposited on a semiconductor substrate. In some cases, the semiconductor substrate functions as a lower electrode.

The following characteristics are required for the above capacitor: a large Q factor, a large specific inductive capacity, and a small capacitance-temperature coefficient. The capacitance-temperature coefficient may be positive or negative, but is preferably near "0" at the resonance frequency.

Conventional dielectric ceramics having the above characteristics are fired $BaO$—$TiO_2$-based dielectric ceramics which contain samarium oxide ($Sm_2O_3$), gadolinium oxide ($Gd_2O_3$), dysprosium oxide ($Dy_2O_3$), europium oxide ($Eu_2O_3$), or the like. However, the specific inductive capacity $\in_r$ is controllable only in the range of 61 to 72 and the temperature coefficient τ is controllable only in the range of −24 to 31 ppm/° C. by conventional technology for producing dielectric ceramics.

Technology development has been conducted in the above background, resulting in a dielectric ceramic laminate formed by the lamination of a first dielectric ceramic sheet having a positive temperature coefficient at a resonance frequency and a second dielectric ceramic sheet The dielectric ceramic laminate is provided by performing the following steps: producing the first dielectric ceramic disk by preparing a raw material having a desired composition, forming the material into a disk having a diameter of 16 mm and a thickness of 9 mm, and then firing the sheet at 1,260 to 1,450° C. for several hours; producing the second dielectric ceramic disk having the same size as the first one by forming and then firing a raw material having another composition; cutting both disks into sheets each having a thickness of 1 mm; and then laminating the sheets.

The dielectric ceramic laminate has a desired specific inductive capacity and a desired temperature coefficient. This is accomplished by laminating dielectric ceramic sheets having different volumes, but the same specific inductive capacity. The desired specific inductive capacity and a desired temperature coefficient of the dielectric ceramic laminate may also be achieved when the laminated dielectric ceramic sheets have different specific inductive capacities.

The above method can provide a capacitor composed of laminated sheets but can not provide a thinner and lighter one because the capacitor is produced by laminating a plurality of sheets including a first dielectric ceramic sheet and a second dielectric ceramic sheet which both having a thickness of about 1 mm. Thus, it is difficult for known methods to form a capacitor having a thickness of 1 mm or less.

SUMMARY OF THE INVENTION

To achieve the foregoing and other objects of the invention, the present invention provides a thin-film capacitor which is smaller, thinner, and lighter than a conventional one, and further has improved temperature compensation by using dielectric materials which have a low specific inductive capacity and of which temperature dependence is controllable.

In an embodiment of the present invention a thin-film capacitor is provided which has the above characteristics and a large Q factor at a high frequency of 1 GHz or more. In other embodiments an electronic device is provided which is resistant to changes in temperature, in which the device comprises the thin-film capacitor having the above characteristics.

In other aspects of the present invention, a thin-film capacitor having a negative capacitance-temperature coefficient of which the absolute value is 200 ppm/° C. is provided by using a material having a linear thermal expansion coefficient of 25 ppm/° C. or more.

In some embodiments, a thin-film capacitor having excellent performance is provided by using a dielectric thin-film having a specific inductive capacity of 4.0 or less and a linear thermal expansion coefficient of 25 ppm/° C. or more. The dielectric thin-film has a reduced difference in capacitance in processing and has a large Q factor at a high frequency. Also, miniaturizing, thinning, and lightening the capacitor having a function of temperature compensation is achieved.

In other embodiments, the temperature-compensating thin-film capacitor includes a dielectric thin-film placed between a pair of electrodes, in which the dielectric thin-film has a specific inductive capacity of 4.0 or less and a linear thermal expansion coefficient of 25 ppm/° C. or more. Accordingly, the thin-film capacitor is hardly affected by processing accuracy, and has a small difference in capacitance. Also, miniaturizing, thinning, and lightening the capacitor for temperature compensation are achieved.

In yet other embodiments a thin-film capacitor is provided having a Q factor of 100 or more at a high frequency of 1 GHz or more exhibits a small dielectric loss at a high frequency. Accordingly, the thin-film capacitor is suitable for a circuit for a high frequency of 1 GHz or more.

In some embodiments, the dielectric thin-film of the present invention contains a fluoric polymer as a main component and exhibits a specific inductive capacity of 4.0 or less and a linear thermal expansion coefficient of 25 ppm/° C. or more. Also, the thin-film capacitor including the film placed between the electrodes exhibits a Q factor of 100 or more at a frequency of 1 GHz or more, according to the kind of the fluoric polymer.

In other embodiments, the dielectric thin-film of the present invention contains a benzocyclobutene polymer or a naphthocyclobutene polymer as a main component, and has a specific inductive capacity of 4.0 or less and a linear thermal expansion coefficient of 25 ppm/° C. or more. Also, the capacitor including the film placed between the electrodes has a Q factor of 100 or more at a frequency of 1 GHz or more, according to the kind of the benzocyclobutene or naphthocyclobutene polymer. In this embodiment, the benzocyclobutene polymer and the naphthocyclobutene polymer provide corrosion resistance against a resist-developing solution and a resist-peeling solution used for forming electrodes. Accordingly, the dielectric thin-film composed of the polymers is advantageous with regard to corrosion resistance.

In a device embodiment, an electronic device is provided, which includes the temperature-compensating thin-film capacitor of the present invention, in which the electronic circuit of the device requires a temperature compensation. Accordingly, electronic devices, such as a portable electronic device and microwave communication equipment, including the above electronic circuit is resistant to changes in temperature.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known steps and/or structures have not been described in detail in order to not unnecessarily obscure the present invention.

The embodiments of the present invention will be described in detail with reference to drawings but the present invention is not limited to the following embodiments.

The temperature-compensation aspects of the present invention will be herein described.

The temperature dependence of a dielectric constant was studied according to a theory based on the Clausius-Mosotti's equation shown in equation (1) below:

$$\frac{(k-1)}{(k+2)} = \alpha_m / 3\varepsilon_0 V \tag{1}$$

wherein k is the specific inductive capacity and $\alpha_m/V$ is the polarization per unit volume.

By differentiating equation (1) with respect to temperature T, equation (2) is derived:

$$\frac{1}{k}\frac{\partial k}{\partial T} = \frac{(k-1)(k+2)}{k}(A+B+C) + K\tan\delta \tag{2}$$

wherein tan δ is the dielectric loss tangent and K is the linear thermal expansion coefficient, K being about $1\times10^4$ ppm/°C., $$A = -\frac{1}{3V}\left(\frac{\partial V}{\partial T}\right)_P < 0, \tag{3}$$

$$B = \frac{1}{3\alpha_m}\left(\frac{\partial \alpha_m}{\partial V}\right)_T\left(\frac{\partial V}{\partial T}\right)_P > 0, \text{ and} \tag{4}$$

$$C = \frac{1}{3\alpha_m}\left(\frac{\partial \alpha_m}{\partial V}\right)_V < 0. \tag{5}$$

Figure 6:
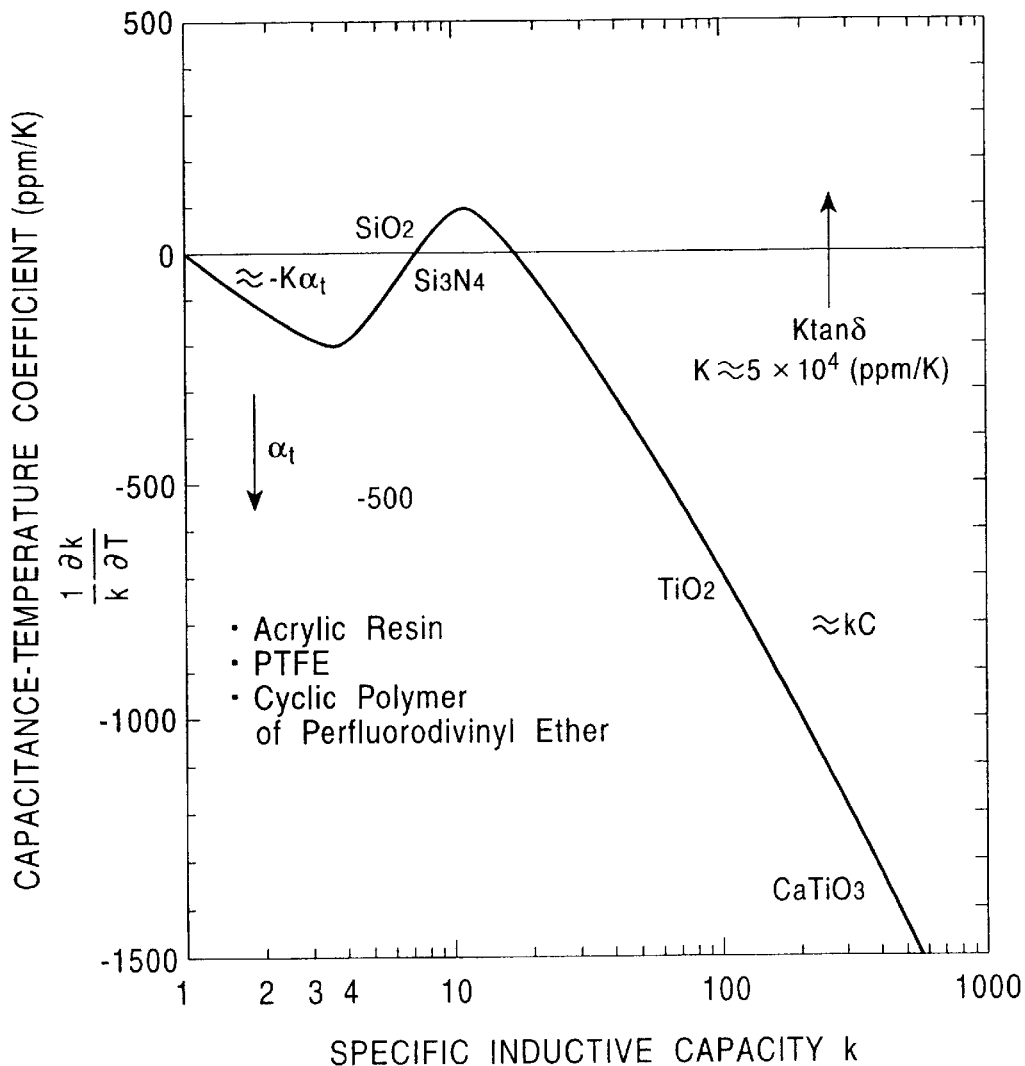
FIG. 6 is a schematic view showing the relationship between the specific inductive capacity and the capacitance-temperature coefficient, in which the relationship is derived by differentiating the Clausius-Mosotti's equation with respect to temperature.

The relationship between the specific inductive capacity and the capacitance-temperature coefficient based on equation (2) is shown in FIG. 6.

Experimental results indicated that there is a temperature dependency correlation between the electron density in the polarization of a dielectric material and the capacitance-temperature coefficient.

FIG. 6 shows that there are three regions in the specific inductive capacity; namely, a low region, a middle region, and a high region.

Polarization in the low region of the specific inductive capacity k, in which k is 1 to 4, is mainly electronic polarization and the electronic polarization does not depend on temperature. However, the specific inductive capacity changes according to changes in temperature because the degree of the electronic polarization changes according to changes in temperature. Accordingly, the capacitance-temperature coefficient is linearly dependant on the product of the specific inductive capacity and the linear thermal expansion coefficient. As a result, the capacitance-temperature coefficient is controllable in the range of minus several hundreds to minus several thousands ppm/° C. by using materials having a linear thermal expansion coefficient of several tens to minus several hundreds ppm/° C. By way of example, a thin-film capacitor having a negative capacitance-temperature coefficient of which the absolute value is 200 ppm/° C. is can be achieved by using a material having a linear thermal expansion coefficient of at least 25 ppm/° C. Experiments have confirmed that a capacitor including a thin-film capacitor which is composed of an acrylic polymer (k=3.5) having a linear thermal expansion coefficient of 170 to 210 ppm/° C. had a capacitance-temperature coefficient of about −2000 ppm/° C. However, the acrylic polymer can not be used for electronic circuits having a semiconductor junction operating at high frequency because the acrylic polymer has a small Q factor at high frequency, namely, a Q factor of 30 at 1 GHz.

Experiments on materials having a suitable linear thermal expansion coefficient and a high Q factor at a high frequency, especially frequencies above 1 GHz, indicate that the following polymers are suitable for the dielectric thin film: a fluoric polymer such as a cyclic polymer of perfluorodivinyl ether, polypropylene, or a benzocyclobutene or naphthocyclobutene polymer. The above cyclic polymer had a specific inductive capacity of 2.1 and a linear thermal expansion coefficient of 70 to 100 ppm/° C. When a capacitor included a dielectric thin-film composed of the cyclic polymer placed between the electrodes, the capacitor had a capacitance-temperature coefficient of −600 to −700 ppm/° C. The above benzocyclobutene or naphthocyclobutene polymer had a specific inductive capacity of 2.7 and a linear thermal expansion coefficient of 50 to 70 ppm/° C. When a capacitor included a dielectric thin-film composed of the benzocyclobutene or naphthocyclobutene polymer and was placed between electrodes, the capacitor had a capacitance-temperature coefficient of −350 to −400 ppm/° C. In the middle region of the specific inductive capacity k in FIG. 6, in which k is about 4 to 30, polarization is an intermediate combination of electric polarization and atomic polarization. Regarding temperature dependence of the specific inductive capacity, a positive dependence due to a decrease in the inherent atomic vibration value competes with a negative dependence, which negative dependence is due to the above change in degree of polarization. The positive dependence is due to the nonlinearity of atomic vibration potential. Thus, the specific inductive capacity may have a negative or positive value. The inventors investigated the capacitance-temperature coefficients of $Si_3N_4$ as an example of $SiN_x$ and $SiO_2$ as an example of $SiO_x$, and then found that $Si_3N_4$ had a capacitance-temperature coefficient of 0 ppm/° C. and $SiO_2$ had a capacitance-temperature coefficient of −120 ppm° C. Placing a single dielectric thin film composed of $SiN_x$ or $SiO_x$ between electrodes could not provide a capacitor having desired characteristics because the Q factor of a capacitor having such a structure decreases proportionately with the capacitance-temperature coefficient, resulting in a negative value. However, when a dielectric thin film composed of a dielectric material having the above specific inductive capacity in the middle region was used in combination with a dielectric thin film composed of a fluoric polymer such as a cyclic polymer of perfluorodivinyl ether, a specific inductive capacity of the combination of the above dielectric thin films was controllable in the range of 0 to −700 ppm/° C. by adjusting the ratio of the thicknesses of the dielectric thin films.

The thermal expansion coefficient should be appropriately selected. The following will describe the use of a dielectric thin film having a linear thermal expansion coefficient of 25 ppm/° C.

Capacitance-temperature coefficient of a junction capacitance is normally 200 to 500 ppm/° C. in electronic circuits having a semiconductor junction, so that a temperature-compensating thin-film capacitor included in the electronic circuits needs to have a capacitance-temperature coefficient of −200 ppm/° C or less in order to compensate the above positive coefficient.

Equation (6) shows the relationship between the capacitance-temperature coefficient, linear thermal expansion coefficient, and specific inductive capacity, $$T_{cc} = -a \cdot \alpha t \cdot k \quad (6)$$

wherein $T_{cc}$ represents the capacitance-temperature coefficient, −α is 4, αt represents the linear thermal expansion coefficient, and k represents the specific inductive capacity. When the specific inductive capacity is 4 or less, the linear thermal expansion coefficient needs to be at least 12.5 ppm/° C. in order to make the capacitance-temperature coefficient be −200 or less, according to equation (6). A specific inductive capacity of 4 or less and a linear thermal expansion coefficient of 25 ppm/° C. or more are within the scope of the present invention.

Figure 7:
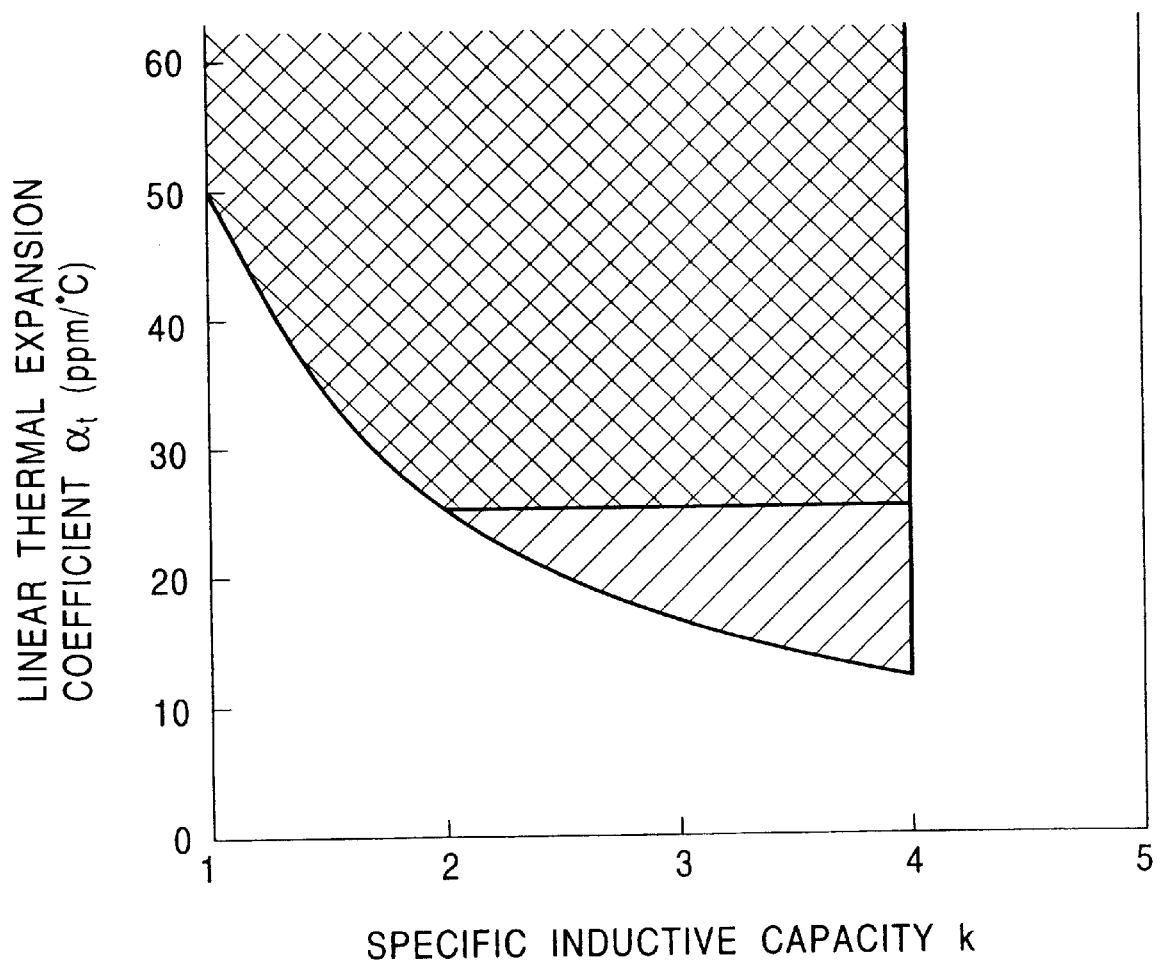
FIG. 7 is a schematic view showing the relationship between the specific inductive capacity and the linear thermal expansion coefficient of a dielectric thin-film.

FIG. 7 shows the relationship between the specific inductive capacity and the linear thermal expansion coefficient. The diagonally shaded region in FIG. 7 is the region that the capacitance-temperature coefficient is −200 ppm/° C. or less if the specific inductive capacity is 4 or less. The diagonally shaded region is within the scope of the present invention.

The capacitor of the present invention includes a dielectric thin film having a specific inductive capacity of 4.0 or less and a linear thermal expansion coefficient of 25 ppm/° C. or more in which the dielectric thin film is placed between electrodes.

The specific inductive capacity is preferably 1.5 to 4.0, more preferably 1.5 to 2.5 because the capacitance-temperature coefficient constantly exhibits a negative value in the stable region of the electronic polarization. When a temperature-compensating thin-film capacitor includes such a dielectric thin film, the capacitance-temperature coefficient is controllable in the negative range by using the dielectric thin film having a linear thermal expansion coefficient of 25 ppm/° C. or more. Also, when the thin-film capacitor includes the dielectric thin film having a specific inductive capacity of 4.0 or less, the thin-film capacitor has very little difference in capacitance due to processing accuracy and has a good temperature-compensating function. Also, miniaturization, thinning, and lightening of the thin-film capacitor is achieved by using such a dielectric thin film. The capacitance-temperature coefficient of a junction capacitance is normally a positive value in electronic circuits having a semiconductor junction, so that a temperature-compensating thin-film capacitor included in the electronic circuits needs to have a negative capacitance-temperature coefficient in order to compensate the above positive coefficient. The thin-film capacitor is particularly required to have a capacitance-temperature coefficient of −200 to −500 ppm/° C. When the linear thermal expansion coefficient is less than 25 ppm/° C., controlling the capacitance-temperature coefficient in the above range is difficult. Hence, the dielectric thin film of the present invention has a linear thermal expansion coefficient of at least 25 ppm/° C.

The thin-film capacitor having the above structure preferably has a Q factor of at least 100, and more preferably at least 300 at a frequency of 1 GHz or more in the present embodiment. The thin-film capacitor includes the dielectric thin film having a specific inductive capacity of 4.0 or less and a linear thermal expansion coefficient of 25 ppm/° C. or more, in which the thin-film capacitor has a Q factor of 100 or more at a frequency of 1 GHz or more when the thin-film capacitor includes the dielectric thin film. Consequently, the thin-film capacitor has a small dielectric loss at a high frequency of 1 GHz or more and is suitable for a high frequency circuit.

The thin-film capacitor having the above structure preferably has a negative capacitance-temperature coefficient, and more preferably a capacitance-temperature coefficient of 200 ppm/° C. or less in the present embodiment.

Because a capacitance-temperature coefficient of a junction capacitance is normally positive in electronic circuits having a semiconductor junction, a temperature-compensating thin-film capacitor having a negative capacitance-temperature coefficient compensates the positive coefficient of the junction capacitance with the negative coefficient. In particular, the capacitance-temperature coefficient of the thin-film capacitor is preferably –200 ppm/° C. or less.

The thin-film capacitor in the present embodiment preferably contains a fluoric polymer as a main component. The above fluoric polymer may be a crystalline perfluoropolymer such as polytetrafluoroethylene (PTFE), tetrafluoroethylene-perfluoroalkylvinyl ether copolymer (PFA), or tetrafluoroethylene-hexafluoropropylene copolymer (FEP), an amorphous perfluoropolymer such as a cyclic polymer of perfluorodivinyl ether, or a fluoric polymer such as polychrolotrifluoroethylene (PCTFE), tetrafluoroethylene-ethylene copolymer (ETFE), or chrolotrifluoroethylene-ethylene copolymer (ECTFE).

The dielectric thin film containing the above fluoric polymer has a specific inductive capacity of 4.0 or less and a linear thermal expansion coefficient of 25 ppm/° C. or more. Also, a thin-film capacitor including such a dielectric thin film has a Q factor of 100 or more, preferably 300 or more at a frequency of 1 GHz or more, depending on the kind of the fluoric polymer.

The cyclic polymer of perfluorodivinyl ether is preferable in particular. Using the cyclic polymer dissolved in perfluorobutylamine easily forms a dielectric thin-film by spin coating. Hence, a production process is simplified. The dielectric thin film of the present invention may be composed of a material containing polypropylene (PP), polyether ether ketone (PEEK), or syndiotactic polystyrene (SPS) as a main component, except for a material containing the above fluoric polymer.

In another embodiment of the present invention, when the dielectric thin film of the previous embodiment is composed of a material containing the cyclic polymer of perfluorodivinyl ether as a main component, a protective coating is preferably formed on the dielectric thin film to cover the entire dielectric thin film. That is, covering the entire dielectric thin film, containing the cyclic polymer of perfluorodivinyl ether, with the protective coating prevents the dielectric thin film from corroding. The corrosion occurs because the cyclic polymer is corroded by the resist-developing solution and the resist-peeling solution used for forming electrodes. The material of the protective coating may be selected from the group consisting of $SiN_x$, such as $Si_3N_4$, $SiO_x$, such as $SiO_2$, amorphous $SiO_xN_y$, Ti, and similar materials.

The thin-film capacitor of the present invention may be composed of a material containing a polymer having a condensed polynuclear hydrocarbonic group and an unsaturated bond in the molecule thereof.

In other embodiments, the above material may contain for example a benzocyclobutene or naphthocyclobutene polymer as a main component. A benzocyclobutene or naphthocyclobutene polymer may be a polymer having a benzocyclobutene or naphthocyclobutene group and an ethylenic group in the molecule thereof, or a polymer having a benzocyclobutene or naphthocyclobutene group, an ethylenic group, and a siloxane bond in the molecule thereof.

When the dielectric thin film contains the above benzocyclobutene or naphthocyclobutene polymer as a main component, the dielectric thin film has a specific inductive capacity of 4.0 or less and a linear thermal expansion coefficient of 25 ppm/° C. or more. Also, the thin-film capacitor including the dielectric thin film may have a Q factor of at least 100, preferably at least 300, at a frequency of 1 GHz or more according to the kind of the benzocyclobutene or naphthocyclobutene polymer. When the dielectric thin film is composed of the benzocyclobutene or naphthocyclobutene polymer, it may not be necessary to apply the protective coating on the dielectric thin film because the above polymer is resistant to corrosion by a resist-developing solution and a resist-peeling solution used for forming electrodes.

In yet another embodiment of the present invention, the temperature-compensating thin-film capacitor of the previous embodiments includes a first dielectric thin film which has a specific inductive capacity of 4.0 or less and a linear thermal expansion coefficient of 50 ppm/° C. or more, and a second dielectric thin film which has a capacitance-temperature coefficient with an absolute value of 50 ppm/° C. or less, in which the first and the second dielectric thin films are placed between electrodes.

The capacitance-temperature coefficient of the thin-film capacitor is controllable within the range of 0 to –700 ppm/° C. by varying the ratio of the thickness of the first dielectric thin-film to that of the second dielectric thin-film. Accordingly, the thin-film capacitor can be adjusted to have a capacitance-temperature coefficient which is suitable for electronic circuits which are used for portable electronic devices, microwave communication equipment, or the like and require temperature compensation. Thus, the electronic circuits including the thin-film-capacitor have various uses.

Since the thin-film capacitor has a multilayer structure composed of the first and the second dielectric thin-films, miniaturization and thinning of the thin-film capacitor is easily achieved in comparison with conventional sheet capacitors having a lamination structure composed of dielectric ceramics.

The first dielectric thin-film may be composed of materials containing a fluoric polymer as a main component.

The first dielectric thin-film may be composed of suitable materials other than a fluoric polymer. By way of example, suitable materials include compositions containing polypropylene (PP), polyether ether ketone (PEEK), or syndiotactic polystyrene (SPS) as a main component.

When the first dielectric thin-film contains a fluoric polymer such as a cyclic polymer of perfluorodivinyl ether as a main component, the second dielectric thin-film is preferably formed above the first dielectric thin-film. Because the fluoric polymer is corroded by a resist-developing solution and a resist-peeling solution used for forming electrodes as described above, the second dielectric thin-film covering the entire first dielectric thin-film prevents the first dielectric thin-film from corrosion. The material of the second dielectric thin-film may be selected from the group consisting of $SiN_x$ such as $Si_3N_4$, $SiO_x$ such as $SiO_2$, and amorphous $SiO_xN_y$.

When the first dielectric thin-film contains a fluoric polymer such as a cyclic polymer of perfluorodivinyl ether as a main component and the first dielectric thin-film is formed above the second dielectric thin-film, the protective coating is preferably formed above the first dielectric thin-film to cover the entire first dielectric thin-film. The protective coating covering the entire first dielectric thin-film prevents the first dielectric thin-film from corrosion according to the same reason as described above. The protective coating may be composed of a material which is resistant to corrosion by the resist-developing solution and the resist-peeling solution used for forming electrodes and is selected from the group consisting of $SiN_x$ such as $Si_3N_4$, $SiO_x$ such as $SiO_2$, and amorphous $SiO_xN_y$.

In another embodiment of the present invention, the first dielectric thin-film may contain the benzocyclobutene or naphthocyclobutene polymer as a main component. Because such a polymer is resistant to corrosion by the resist-developing solution and the resist-peeling solution, the protective coating is not necessary to be provided above the first dielectric thin-film.

The electronic device of the present invention has the temperature-compensating thin-film capacitor of the present invention as described above. When electronic circuits which includes a semiconductor junction and requires temperature compensation that includes the thin-film capacitor of the present invention, the temperature stability of the electronic device including the electronic circuit is excellent, in which the electronic devices include portable electronic devices, microwave communication equipment, and other similar devices.

Other embodiments of the present invention will be herein presented.

First Embodiment

Figure 1:
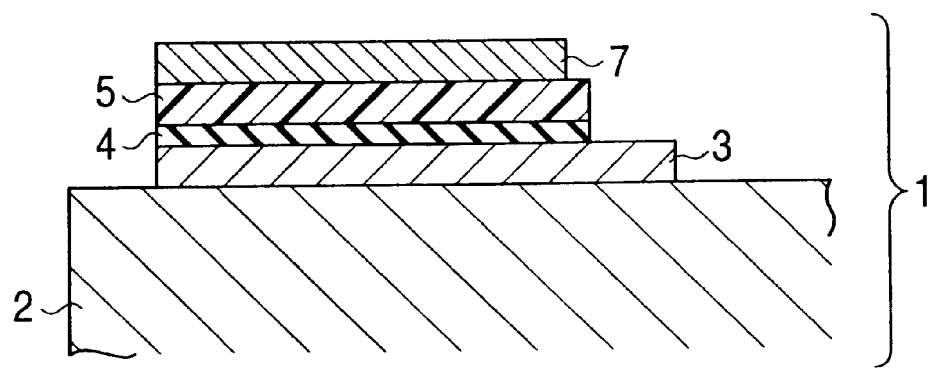
FIG. 1 is a sectional view showing the first embodiment of the temperature-compensating thin-film capacitor of the present invention.
Figure 2:
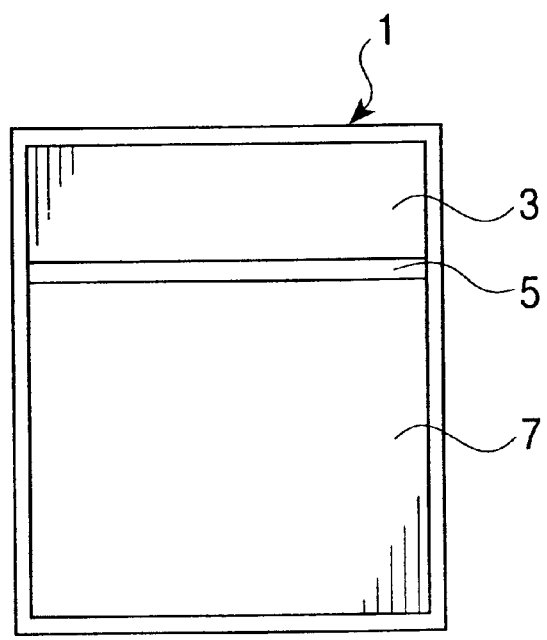
FIG. 2 is a plan view of the thin-film capacitor shown in FIG. 1.

FIG. 1 shows a temperature-compensating thin-film capacitor of a first embodiment of the present invention. The thin-film capacitor 1 is formed by depositing a thin first electrode layer (a lower electrode) 3, a second dielectric thin-film 4, a first dielectric thin-film 5, and a thin second electrode layer (an upper electrode) 7, in that order on a rectangular surface of a substrate 2 when shown in a plan view.

The substrate 2 may be composed of any material, as long as the substrate 2 has an enough thickness to provide proper stiffness to the entire capacitor and is resistant to high temperatures while depositing the following layers or films on the substrate 2: the first electrode layer 3; the second dielectric thin-film 4; the first dielectric thin-film 5; and the second electrode layer 7. Materials that satisfy the above condition are a silicon wafer, $SiO_2$, $Al_2O_3$, and so on.

The first electrode layer 3 and the second electrode layer 7 may have a monolayer structure consisting of a single metal such as Cu, Ag, Au, and Pt, or may have a laminate structure consisting of a plurality of metal layers. The laminate structure may be formed by depositing layers of silicon oxide, elemental chromium, elemental nickel, chromium oxide, nickel oxide, platinum, and so on.

The above second dielectric thin-film 4 preferably has a high dielectric strength, a large Q factor, and a capacitance-temperature coefficient which is smaller than the coefficient of the first dielectric thin-film 5.

The second dielectric thin-film 4 preferably has capacitance-temperature coefficient with an absolute value of 50 ppm/° C. or less. The second dielectric thin-film 4 preferably has a capacitance-temperature coefficient with an absolute value of 50 ppm/° C. or less, a specific inductive capacity of 10 or less, a field intensity resistance of at least 5 MV/cm and more preferably at least 8 MV/cm, a non-loaded Q factor of at least 200 and more preferably at least 500 at a frequency of at least 1 GHz, and a dielectric relaxation time of at least 1 second. Also, the second dielectric thin-film 4 preferably has a thickness of 1 μm ($1 \times 10^{-6}$ m) or less and more preferably in the range of 500 to 5,000 Å (0.05 to 0.5 μm), in order to achieve high dielectric strength, miniaturization, and high productivity.

Materials that satisfy the above conditions are $SiN_x$, $SiO_x$, amorphous $SiO_xN_y$, and so on. The $SiN_x$ layer may be formed by film deposition such as PECVD. The amorphous $SiO_xN_y$ layer may be formed by film deposition such as sputtering or PECVD.

The above first dielectric thin-film 5 may have a lower dielectric strength, and preferably has a smaller linear thermal expansion coefficient than the coefficient of the second dielectric thin-film 4.

The first dielectric thin-film 5 preferably has a specific inductive capacity of 4.0 or less and a linear thermal expansion coefficient of 50 ppm/° C. or more. The first dielectric thin-film 5 more preferably has a specific inductive capacity of 4.0 or less, a linear thermal expansion coefficient of 50 ppm/° C. or more, and a negative capacitance-temperature coefficient. Further, the first dielectric thin-film 5 more preferably has a specific inductive capacity of 4.0 or less, a linear thermal expansion coefficient of 50 ppm/° C. or more, a negative capacitance-temperature coefficient, and capacitance-temperature coefficient with an absolute value of 200 ppm/° C. or more.

The thin-film capacitor preferably has a Q factor of at least 100 and more preferably at least 300 at a frequency of 1 GHz or more when the first dielectric thin-film 5 is placed between the first electrode layer 3 and the second electrode layer 7.

Further, the first dielectric thin-film 5 preferably has a specific inductive capacity in the range of 1.5 to 4.0 and more preferably 1.5 to 2.5.

The first dielectric thin-film 5 may contain, for example, a fluoric polymer or at least one polymer selected from the group consisting of polypropylene, polyether ether ketone, and syndiotactic polystyrene as a main component. The above fluoric polymer may be a crystalline perfluoropolymer such as polytetrafluoroethylene, tetrafluoroethylene-perfluoroalkylvinyl ether copolymer, or tetrafluoroethylene-hexafluoropropylene copolymer, an amorphous perfluoropolymer such as a cyclic polymer of perfluorodivinyl ether, or a fluoric polymer such as polychrolotrifluoroethylene, tetrafluoroethylene-ethylene copolymer (ETFE), or chrolotrifluoroethylene-ethylene copolymer. The cyclic polymer of perfluorodivinyl ether is preferable in particular because the first dielectric thin-film 5 is easily formed by spin coating, spraying, or dipping (soaking) where the resulting first dielectric thin-film 5 has a Q factor of 100 or more at a frequency of 1 GHz.

Also, the first dielectric thin-film 5 may contain a benzocyclobutene polymer or a naphthocyclobutene polymer as a main component. The benzocyclobutene polymer or a naphthocyclobutene polymer has, for example, a benzocyclobutene or naphthocyclobutene group and an ethylene group, or a benzocyclobutene or naphthocyclobutene group, an ethylene group, and a siloxane bond. An example of a method for forming the first dielectric thin-film 5 by using a benzocyclobutene or naphthocyclobutene polymer is as follows. A solution containing a solvent and a monomer having structural formula (I) is applied onto the surface of the substrate 2, on which the first electrode layer 3 has been formed, by spin coating, spraying, dipping (soaking) or the like, and then the solvent is removed during curing on a hot plate. Thus, the monomer is polymerized to form the first dielectric thin-film 5 composed of the benzocyclobutene or naphthocyclobutene polymer.

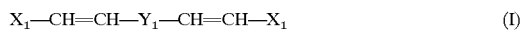

$$X_1—CH=CH—Y_1—CH=CH—X_1 \qquad (I)$$

wherein $X_1$ represents

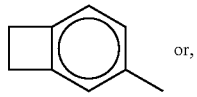 or, 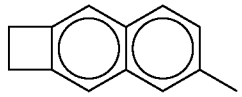

$Y_1$ represents a single bond, $—CH_2—CH_2—$, or $—Si(R)_2—O—Si(R)_2—$, wherein R represents an alkyl group.

The first dielectric thin-film 5 preferably has a thickness in the range of about 50 to 500 nm (500 to 5,000 Å).

Since the first dielectric thin-film 5 used for the thin-film capacitor 1 of the first embodiment has a linear thermal expansion coefficient of 50 ppm/° C. or more, the capacitance-temperature coefficient is made to have a negative value. Also, the first dielectric thin-film 5 has a specific inductive capacity of 4.0 or less, hence a difference in the specific inductive capacity between films 4 and 5 due to processing tolerance is reduced and accurate temperature compensation is achieved. The first dielectric thin-film 5 having a capacitance-temperature coefficient of −200 ppm/° C. or less is provided to adequately counteract the capacitance-temperature coefficient of the second dielectric thin-film 4.

The Q factor, the voltage resistance, and the capacitance-temperature coefficient of a capacitor are controlled by adjusting the thickness and the composition of the first dielectric thin-film 5 and the second dielectric thin-film 4, so that devices having very stable characteristics in an operating environment in which temperature changes significantly are provided.

Also, the thin-film capacitor 1 has a multilayer structure composed of the first dielectric thin-film 5 and the second dielectric thin-film 4, that is, the structure of the thin-film capacitor 1 is different from that of conventional laminates composed of dielectric ceramic sheets. Thus, thinning and miniaturization are easily achieved and a capacitor having a thickness of 5 $\mu$m ($5 \times 10^{-6}$ m), for example, is possible.

Figure 10:
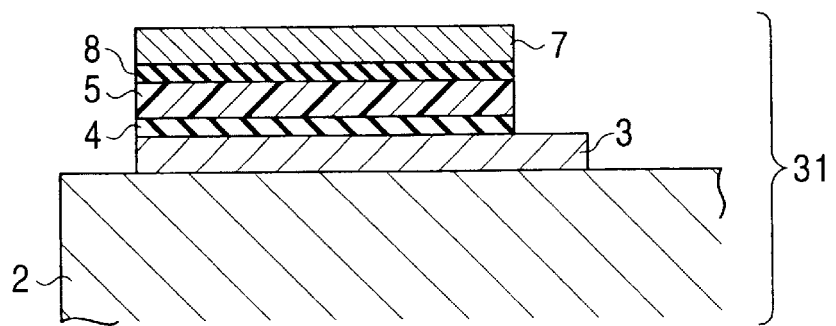
FIG. 10 is a sectional view showing the third embodiment of the temperature-compensating thin-film capacitor of the present invention.

Further, if the first dielectric thin-film 5 is composed of the above benzocyclobutene or naphthocyclobutene polymer, it is not necessary to apply a protective coating 8 as shown in FIG. 10, illustrating the third embodiment of the present invention, because such a polymer is resistant to corrosion due to a resist-developing and a resist-peeling solutions used in forming the electrodes.

As described above, the thin-film capacitor 1 shown in FIG. 1 is useful for communication devices, portable electronic devices such as mobile phones, and other similar devices which require temperature compensation. The capacitor may be used in combination with a varactor diode or an element controlling a frequency according to a voltage; i.e., a voltage controlled oscillator.

Figure 8:
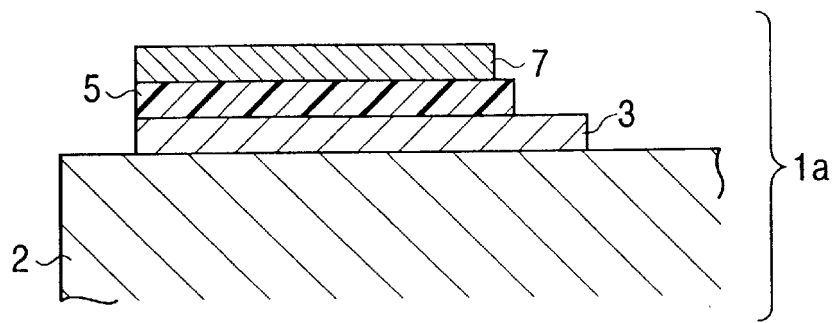
FIG. 8 is a sectional view showing another embodiment of the temperature-compensating thin-film capacitor of the present invention.

Although the first dielectric thin-film 5 and the second dielectric thin-film 4 are formed between the first electrode layer 3 and the second electrode layer 7 in the above embodiment, a thin-film capacitor 1a (FIG. 8) may have the structure in which only the first dielectric thin-film 5 may be provided between the first electrode layer 3 and the second electrode layer 7 as shown in FIG. 8. In FIG. 8, reference numeral 2 represents a substrate.

Figure 3:
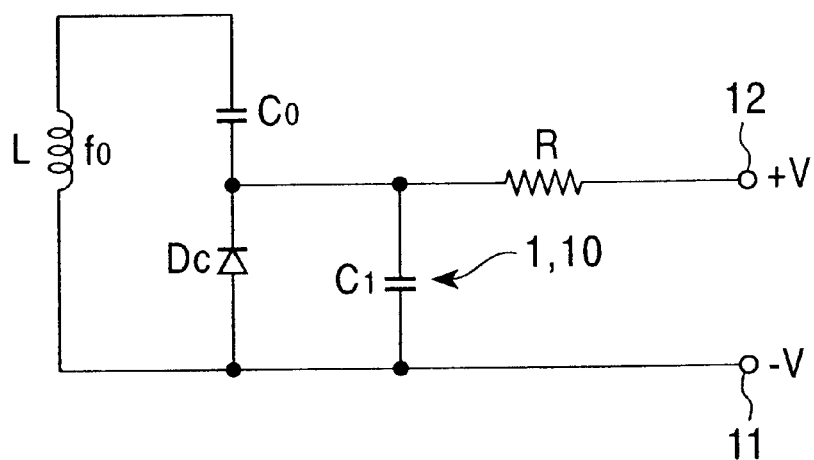
FIG. 3 is a schematic circuit diagram showing an example of an electronic circuit having the thin-film capacitor of the present invention.

FIG. 3 illustrates an example that a thin-film capacitor $C_1$, which is the thin-film capacitor 1 of the present invention, is placed in an electronic circuit. In this circuit, a capacitor $C_0$ is connected in series and a varactor diode $D_c$ is connected in parallel to a coil L, the thin-film capacitor $C_1$ is connected in parallel to the varactor diode $D_c$, input terminals 11 and 12 are connected to the upper electrode 7 and the lower electrode 3 of the thin-film capacitor $C_1$ shown in FIG. 1, and a resistor R is placed between the input terminals 12 and either electrode of the thin-film capacitor $C_1$.

The varactor diode $D_c$ shows a change in capacitance according to voltage. The varactor diode $D_c$ has a predetermined positive capacitance-temperature coefficient, so that a resonance circuit which is resistant to changes in temperature is provided, in which the positive capacitance-temperature coefficient compensates for the capacitance-temperature coefficient of the thin-film capacitor $C_1$.

Figure 4:
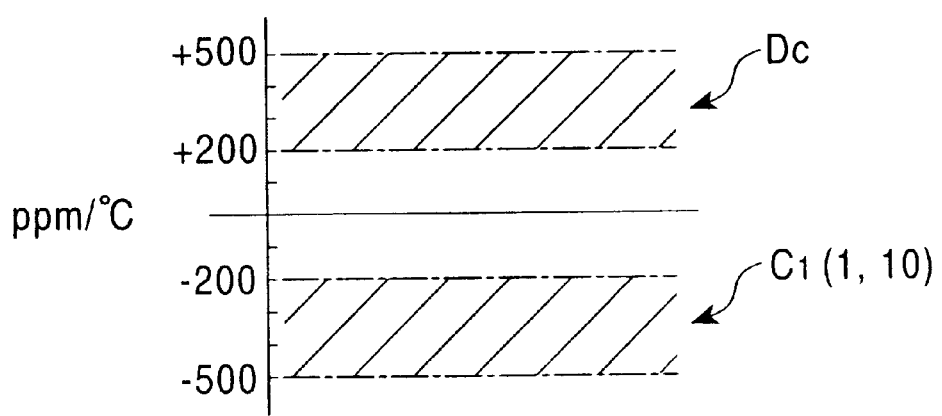
FIG. 4 is a graph showing the relationship between the capacitance-temperature coefficient of the thin-film capacitor of the present invention and that of a varactor diode.

Capacitance-temperature coefficients are shown in FIG. 4. When the varactor diode $D_c$ has a capacitance-temperature coefficient in the range of 200 to 500 ppm/° C., the capacitance-temperature coefficient of the varactor diode compensates for the capacitance-temperature coefficient of the thin-film capacitor $C_1$ which is in the range of −200 to −500 ppm/° C. As a result, the temperature stability of the circuit is improved. The conventional capacitors as described above do not exhibit such a wide range of capacitance temperature coefficient control.

The thin-film capacitor of the present invention is applicable to temperature-compensating devices such as temperature-compensating circuits of varactor diodes.

Second Embodiment

Figure 9:
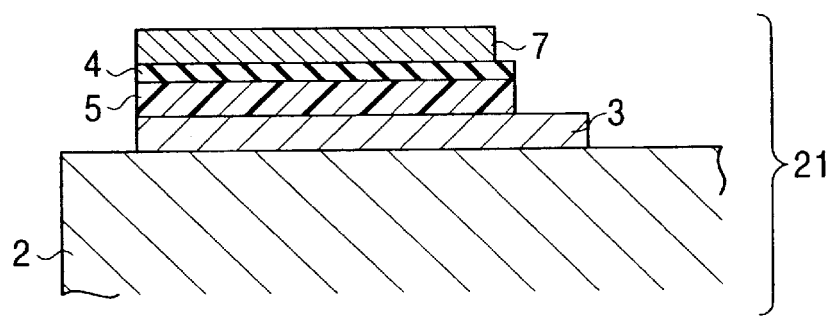
FIG. 9 is a sectional view showing the second embodiment of the temperature-compensating thin-film capacitor of the present invention.

FIG. 9 is a sectional view showing a temperature-compensating thin-film capacitor of a second embodiment of the present invention, where the same components as those of the first embodiment have the same reference number as the first embodiment in this description. In this embodiment, the second dielectric thin-film 4 is deposited on the first dielectric thin-film 5. The deposition order is different from that of the first embodiment, where thin-film 5 is instead deposited first.

The material of the second dielectric thin-film 4 is selected from $SiN_x$, $SiO_x$, and $SiO_xN_y$, which are shown in the first embodiment.

The material of the first dielectric thin-film 5 may contain a fluoric polymer, a benzocyclobutene or naphthocyclobutene polymer, or the like, which are the same material as those used in the first embodiment.

In particular, when a material containing a fluoric polymer such as a perfluorodivinyl ether polymer as a main component is used for the first dielectric thin-film 5 of this embodiment, it is preferable for the first dielectric thin-film 5 that the second dielectric thin-film 4 covers the first dielectric thin-film 5. That is, because the above fluoric polymer is corroded by the resist-developing solution and the resist-peeling solution used for forming electrodes, forming the second dielectric thin-film 4 to cover the first dielectric thin-film 5 prevents the first dielectric thin-film 5 from corroding.

The thin-film capacitor 21 of the second embodiment has the above structure, hence the thin-film capacitor 21 provides the same effect as the thin-film capacitor 1 of the first embodiment.

Third Embodiment

FIG. 10 is a sectional view showing a temperature-compensating thin-film capacitor of the third embodiment of the present invention, where the same components as the first embodiment have the same reference number as the first embodiment. In this embodiment, a first dielectric thin-film 5 which is deposited on a second dielectric thin-film 4 containing the fluoric polymer as a main component and a protective coating 8 is deposited on and used to cover the first dielectric thin-film 5.

The material of the protective coating 8 is preferably corrosion-resistant against a resist-developing solution and a resist-peeling solution used for forming electrodes, and is preferably selected from a group consisting of $SiN_x$ such as $Si_3N_4$, $SiO_x$ such as $SiO_2$, amorphous $SiO_xN_y$, Ti, and the like.

The thin-film capacitor 31 of the third embodiment has the above structure, hence the thin-film capacitor 31 provides the same effect as the thin-film capacitor 1 of the first embodiment. The protective coating 8 is deposited on the first dielectric thin-film 5 containing a fluoric polymer as a main component to cover the first dielectric thin-film 5, so that the first dielectric thin-film 5 is prevented from corrosion which is caused by the resist-developing solution and the resist-peeling solution used for forming electrodes.

Figure 11:
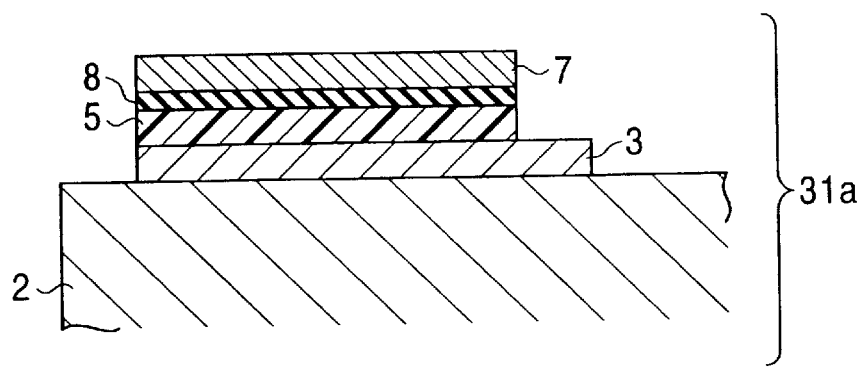
FIG. 11 is a sectional view showing another embodiment of the temperature-compensating thin-film capacitor of the present invention.

In FIG. 10, the protective coating 8, the second dielectric thin-film 4, and the first dielectric thin-film 5 are placed between a first electrode layer 3 and a second electrode layer 7. However, in other embodiments the second dielectric thin-film 4 may be omitted and only the first dielectric thin-film 5 and the protective coating 8 which is deposited thereon may be placed between the first electrode layer 3 and the second electrode layer 7 as shown in FIG. 11. A reference numeral 2 in FIG. 11 represents a substrate.

Several example of the previous embodiments will be herein presented.

EXAMPLES

Example 1

Q factors of various thin-film capacitors (samples 1 to 12) were measured as shown in Table 1. Each capacitor included a dielectric thin-film placed between an upper electrode and a lower electrode which were composed of copper and were deposited on a substrate composed of alumina or glass. Each thickness of the upper electrode and the lower electrode was 1,500 nm (15,000 Å) and the thickness of the dielectric thin-film was 2,000 nm (20,000 Å). The length and width of the upper electrode were controlled within the range of 50 to 1,000 μm in order to keep the capacitance of the thin-film capacitor at 10 pF. The Q factor, the specific inductive capacity, the linear thermal expansion coefficient, the material for composing the thin-film, and the evaluation of each sample is shown in Table 1.

TABLE 1

| Samples | Material | Specific Inductive Capacity (-) | Evalu. | Linear Thermal Expansion Coefficient (ppm/° C.) | Evalu. | Q factor (-) |
|---|---|---|---|---|---|---|
| 1 | PTFE | 2.1 | Superior | 100 | Superior | 5,000 (at 10 GHz) |
| 2 | PFDE | 2.1 | Superior | 74 | Superior | 1,429 (at 10 GHz) |
| 3 | PFA | 2.1 | Superior | 120 | Superior | 3,333 (at 1 GHz) |
| 4 | FEP | 2.1 | Superior | 83 | Superior | 2,000 (at 1 GHz) |
| 5 | PCTFE | 2.3 to 2.5 | Superior | 70 | Superior | 100 (at 1 MHz) |
| 6 | ETFE | 2.6 | Superior | 90 | Superior | 200 (at 1 MHz) |
| 7 | ECTFE | 2.5 | Superior | 80 | Superior | 111 (at 1 MHz) |
| 8 | PP | 2.17 | Superior | 80 | Superior | 5,000 (at 10 GHz) |
| 9 | PEI | 3.1 | Superior | 23 | inferior | 159 (at 10 GHz) |
| 10 | PPS | 4.0 | Superior | 20 | inferior | 1,000 (at 1 MHz) |
| 11 | SPS | 2.9 | Superior | 25 | Superior | 213 (at 10 GHz) |
| 12 | PEEK | 3.1 | Superior | 48 | Superior | 455 (at 10 GHz) |

In Table 1, PTFE represents polytetrafluoroethylene, PFDA represents a cyclic polymer of perfluorodivinyl ether, PFA represents a polytetrafluoroethylene-perfluoroalkylvinyl ether copolymer, FEP represents a tetrafluoroethylene-hexafluoropropylene copolymer, PCTFE represents polychloro trifluoroethylene, ETFE represents a tetrafluoroethylene-ethylene copolymer, ECTFE represents a chlorotrifluoroethylene-ethylene copolymer, PP represents polypropylene, PEI represents polyetherimide, PPS represents polyphenylenesulfide, SPS represents syndiotactic polystyrene, and PEEK represents polyether ether ketone.

In Table 1, a material having a specific inductive capacity of 4.0 or less is superior and a material having a linear thermal expansion coefficient of 25 ppm/° C. or more is also superior, but a material having a linear thermal expansion coefficient of less than 25 ppm/° C. is inferior.

Table 1 shows that controlling the capacitance-temperature coefficients of the dielectric thin-films of Samples 9 and 10 to negative values is difficult because the linear thermal expansion coefficients thereof are less than 25 ppm/° C. On the other hand, controlling the capacitance-temperature coefficients of the dielectric thin-films of Samples 1 to 8 and 11 to 12 in the negative range is possible because the specific inductive capacity and the linear thermal expansion coefficients thereof satisfy the desired conditions. Also, the dielectric thin-films of Samples 1 to 8 and 11 to 12 are hardly affected by processing accuracy, hence, the dielectric thin-films have small differences in capacitance. Although the Q factor generally tends to decrease as the frequency increases, the capacitors of Samples 1 to 4, 8 and 11 to 12 have Q factors of 100 or more at a frequency of 1 GHz or more. That is, the capacitors have excellent high frequency characteristics.

Example 2

Figure 5:
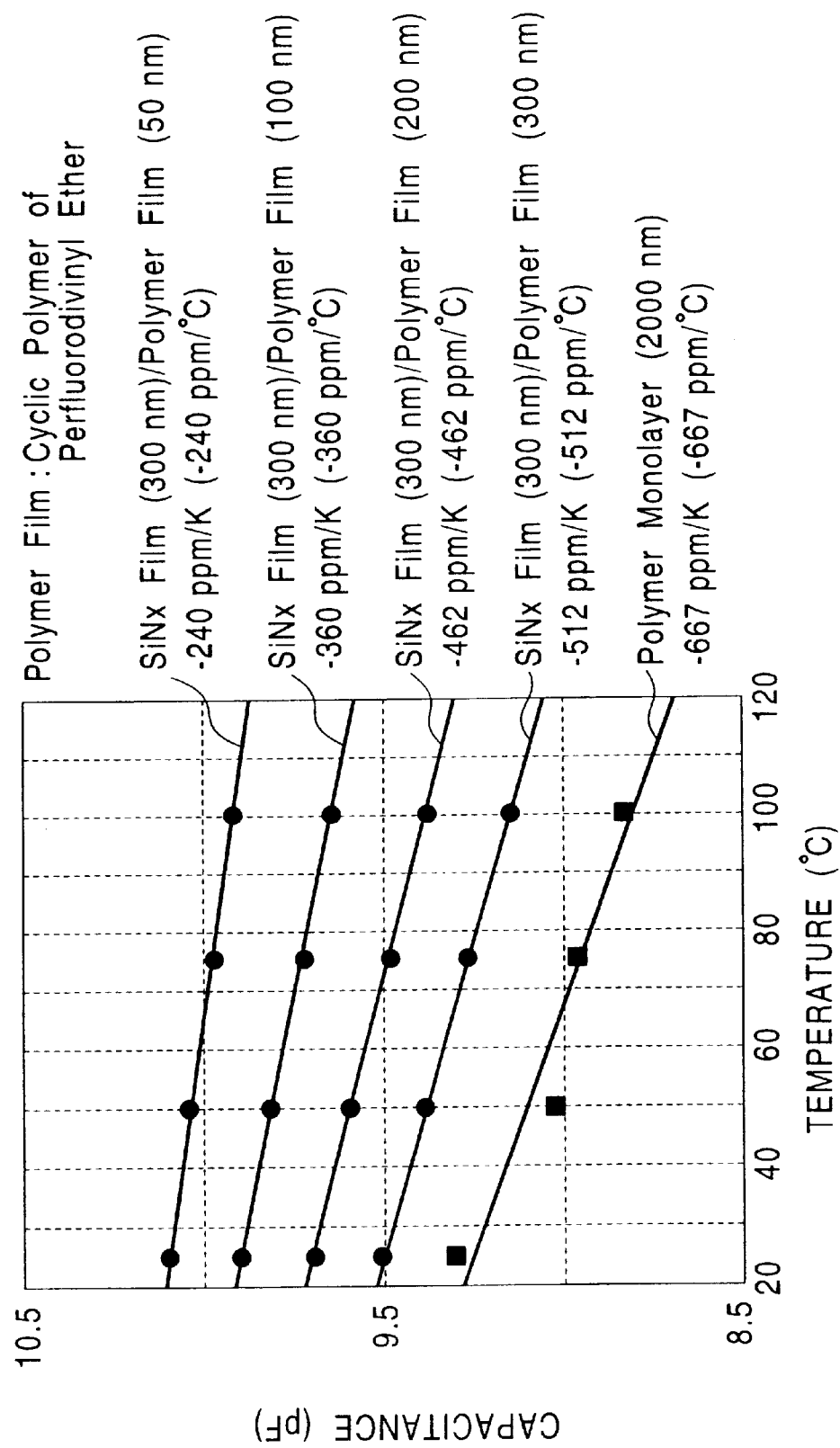
FIG. 5 is a graph showing the temperature characteristic of the first dielectric thin-film of the thin-film capacitor of the present invention, in which the thickness of the first dielectric thin-film is varied.

A thin-film capacitor was prepared according to the procedure described below. The thin-film capacitor had a first and a second dielectric thin-film placed between electrode layers and had a multilayer structure. A capacitance-temperature coefficient, a Q factor at 1 GHz, and a dielectric strength of a thin-film capacitor were measured. The measurement was performed by varying the thickness of the first dielectric thin-film within the range of 50 to 300 nm (500 to 3,000 Å). The capacitance-temperature coefficient was determined according to the slope of the plot of a capacitance (pF) versus temperature (° C.) varied in the range of 20 to 120 ° C., as shown in FIG. 5. The thicknesses of the first dielectric thin-film and the second dielectric thin-film, and the capacitance-temperature coefficient are shown in Table 2.

The thin-film capacitor was prepared as follows. A copper lower electrode having a thickness of 1,500 nm (15,000 Å) was deposited on an alumina or glass substrate by sputtering; and then the dielectric thin-film which was composed of $SiN_x$ and had a thickness of 300nm (3,000 Å) was deposited on the lower electrode by PECVD.

Next, a solution which contains perfluorotributylamine (TFPA) as a solvent and a cyclic polymer of perfluorodivinyl ether was applied onto the second dielectric thin-film by a spin coat method, and then the applied film was cured by (1) curing at 50° C. for 2 minutes, (2) curing at 110° C. for 2 minutes, and (3) curing at 250° C. for 10 minutes, if necessary. The first dielectric thin-film composed of the cyclic polymer of perfluorodivinyl ether was formed thereby on the second dielectric thin-film. Subsequently, the first dielectric thin-film was etched by 20 nm (200 Å) from the surface in argon plasma using a dry etcher; a photoresist pattern was formed on the polymer film by photoresist-coating, pre-baking, exposing, developing, and post-baking; the first dielectric thin-film and the second dielectric thin-film were continuously etched with $SF_6$ or $CF_4$ by a single process; and then the photoresist was removed. Finally, a copper upper electrode layer having a thickness of 1,500 nm (15,000 Å) was formed on the first dielectric thin-film by sputtering at room temperature. The dielectric thin-film having a multilayer structure was provided thereby. The length and width of the upper electrode were controlled within the range of 50 to 1,000 μm in order to keep the capacitance of the thin-film capacitor at 10 pF. The thin-film capacitor had a Q factor in the range of 210 to 290 at a frequency of 1 GHz and a dielectric strength of 200 V or more. The first dielectric thin-film had various Q factors and dielectric strengths according to the thicknesses thereof.

The $SiN_x$ second dielectric thin-film had a linear thermal expansion coefficient of 3 ppm/° C. and a specific inductive capacity of 7.0. Also, the thin-film capacitor had a Q factor of 200 at a frequency of 1 GHz when only the second dielectric thin-film was formed between the electrode layers.

The first dielectric thin-film composed of the cyclic polymer of perfluorodivinyl ether had a linear thermal expansion coefficient of 74 ppm/° C. and a specific inductive capacity of 2.1. Also, the thin-film capacitor had a capacitance-temperature coefficient of −677 ppm/° C. and a Q factor of 300 at a frequency of 1 GHz when only the first dielectric thin-film was formed between the electrode layers.

TABLE 2

| Thickness of first dielectric thin-film (nm) | Thickness of second dielectric thin-film (nm) | Capacitance-temperature coefficient (ppm/° C.) |
|---|---|---|
| 50 | 300 | −240 |
| 100 | 300 | −360 |
| 200 | 300 | −462 |
| 300 | 300 | −512 |

FIG. 5 and Table 2 show that the capacitance-temperature coefficient of the thin-film capacitor, which comprises the second dielectric thin-film (a $SiN_x$ layer) and the first dielectric thin-film (a polymer layer) both placed between the electrodes, is controllable within the range of −240 to −512 ppm° C. The above coefficient is achieved by varying the ratio of the thickness of the first dielectric thin-film to that of the second dielectric thin-film. That is, the thickness of the first dielectric thin-film is varied in the range of 50 to 300 nm when the first dielectric thin-film has a linear thermal expansion coefficient of 74 ppm/° C. and a specific inductive capacity of 2.1. The thin-film capacitor of this embodiment is suitable to a temperature-compensating electronic device including a varactor diode having a positive capacitance-temperature coefficient. Also, FIG. 5 and Table 2 show the following results. Although the thin-film capacitor including only the second dielectric thin-film between the electrodes exhibits a Q factor of 200 at a frequency of 1 GHz, the thin-film capacitor of this embodiment including the second dielectric thin-film and the first dielectric thin-film which are both placed between the electrodes has a Q factor of 210 or more at a frequency of 1 GHz.

Example 3

The relationship between the dimensional difference in processing and the difference in capacitance of a thin-film capacitor were measured while varying the dielectric constant of the copper dielectric thin-film. The dimensional difference in processing translates to a difference between the actual size of a thin-film capacitor and the design size.

The difference in capacitance is caused by the dimensional difference in processing. In the above measurement, the dielectric thin-films were placed between the lower electrode and the upper electrode. The target sheet capacitance of the thin-film capacitor was 10 pF. The capacitance was determined according to equation (7) below:

$$Cs = \epsilon_0 \times \epsilon \times (S/d) \quad (7)$$

wherein $\epsilon_0$ is $8.85 \times 10^{-14}$ F·cm$^{-1}$, S represents the area of the electrodes, d represents the distance between the electrodes, and $\epsilon$ represents the specific inductive capacity.

The dimensional difference in processing and the difference in capacitance of a thin-film capacitor are shown in Table 3. The capacitor included a dielectric thin-film which was composed of ECTFE and had a specific inductive capacity of 2.5, in which the electrode length L was 0.4 mm and the interelectrode distance was 0.3 μm.

The dimensional difference in processing and the difference in capacitance of the thin-film capacitor are shown in Table 4. The capacitor included a dielectric thin-film which was composed of PPS and had a specific inductive capacity of 4, in which the electrode length L was 0.3 mm and the interelectrode distance was 0.3 μm. The PPS material used in this example had a specific inductive capacity which was within the scope of the present invention, but had a linear thermal expansion coefficient which was outside of the scope of the present invention. Accordingly, the PPS material was measured in order to only investigate effects caused by the specific inductive capacity on the difference in capacitance.

Table 5 shows the dimensional difference in processing and difference in capacitance of a thin-film capacitor. The thin-film capacitor had an electrode length L of 0.02 mm and an interelectrode distance of 0.3 μm. The capacitor included a $BaTiO_2$ dielectric thin-film having a specific inductive capacity of 1,000. The interelectrode distance is the same as that of a thin-film capacitor having a specific inductive capacity of 2.5 or 4.

Table 6 shows the dimensional difference in processing and difference in capacitance of a thin-film capacitor. The thin-film capacitor had an electrode length L of 0.3 mm and an interelectrode distance of 80 μm. The capacitor included a $BaTiO_2$ dielectric thin-film having a specific inductive capacity of 1,000. The electrode area of the thin-film capacitor is the same as that of a thin-film capacitor having a specific inductive capacity of 4.

TABLE 3

| Dimensional difference in processing (μm) | Cs (pF) | S (cm$^2$) | d (cm) | Difference in capacitance (± %) |
|---|---|---|---|---|
| 0 | 11.81 | 1.60 × 10$^{-3}$ | 3.00 × 10$^{-5}$ | 5 |
| 1 | 11.86 | 1.61 × 10$^{-3}$ | 3.00 × 10$^{-5}$ | 0.5 |
| 2 | 11.92 | 1.62 × 10$^{-3}$ | 3.00 × 10$^{-5}$ | 1.0 |
| 3 | 11.98 | 1.62 × 10$^{-3}$ | 3.00 × 10$^{-5}$ | 1.5 |
| 4 | 12.04 | 1.63 × 10$^{-3}$ | 3.00 × 10$^{-5}$ | 2.0 |
| 5 | 12.10 | 1.64 × 10$^{-3}$ | 3.00 × 10$^{-5}$ | 2.5 |
| 10 | 12.40 | 1.68 × 10$^{-3}$ | 3.00 × 10$^{-5}$ | 5.1 |

L = 0.4 mm, d = 0.3 μm

TABLE 4

| Dimensional difference in processing (μm) | Cs (pF) | S (cm$^2$) | d (cm) | Difference in capacitance (± %) |
|---|---|---|---|---|
| 0 | 10.62 | 9.00 × 10$^{-4}$ | 3.00 × 10$^{-5}$ | 0 |
| 1 | 10.70 | 9.06 × 10$^{-4}$ | 3.00 × 10$^{-5}$ | 0.6 |
| 2 | 10.77 | 9.12 × 10$^{-4}$ | 3.00 × 10$^{-5}$ | 1.2 |
| 3 | 10.84 | 9.18 × 10$^{-4}$ | 3.00 × 10$^{-5}$ | 1.8 |
| 4 | 10.91 | 9.24 × 10$^{-4}$ | 3.00 × 10$^{-5}$ | 2.4 |
| 5 | 10.98 | 9.30 × 10$^{-4}$ | 3.00 × 10$^{-5}$ | 3.0 |
| 10 | 11.34 | 9.61 × 10$^{-4}$ | 3.00 × 10$^{-5}$ | 6.1 |

L = 0.3 mm, d = 0.3 μm

TABLE 5

| Dimensional difference in processing (μm) | Cs (pF) | S (cm$^2$) | d (cm) | Difference in capacitance (± %) |
|---|---|---|---|---|
| 0 | 11.81 | 4.00 × 10$^{-6}$ | 3.00 × 10$^{-5}$ | 0 |
| 1 | 13.02 | 4.41 × 10$^{-6}$ | 3.00 × 10$^{-5}$ | 10.3 |
| 2 | 14.28 | 4.84 × 10$^{-6}$ | 3.00 × 10$^{-5}$ | 21.0 |
| 3 | 15.61 | 5.29 × 10$^{-6}$ | 3.00 × 10$^{-5}$ | 32.3 |
| 4 | 17.00 | 5.76 × 10$^{-6}$ | 3.00 × 10$^{-5}$ | 44.0 |
| 5 | 18.45 | 6.25 × 10$^{-6}$ | 3.00 × 10$^{-5}$ | 56.3 |
| 10 | 26.58 | 9.00 × 10$^{-6}$ | 3.00 × 10$^{-5}$ | 125.0 |

L = 0.02 mm, d = 0.3 μm

TABLE 6

| Dimensional difference in processing (μm) | Cs (pF) | S (cm$^2$) | d (cm) | Difference in capacitance (± %) |
|---|---|---|---|---|
| 0 | 9.96 | 9.00 × 10$^{-4}$ | 8.00 × 10$^{-3}$ | 0 |
| 1 | 10.03 | 9.06 × 10$^{-4}$ | 8.00 × 10$^{-3}$ | 0.6 |
| 2 | 10.09 | 9.12 × 10$^{-4}$ | 8.00 × 10$^{-3}$ | 1.1 |
| 3 | 10.16 | 9.18 × 10$^{-4}$ | 8.00 × 10$^{-3}$ | 1.7 |
| 4 | 10.23 | 9.24 × 10$^{-4}$ | 8.00 × 10$^{-3}$ | 2.3 |
| 5 | 10.30 | 9.30 × 10$^{-4}$ | 8.00 × 10$^{-3}$ | 2.8 |
| 10 | 10.64 | 9.61 × 10$^{-4}$ | 8.00 × 10$^{-3}$ | 5.7 |

L = 0.3 mm, d = 80 μm

As shown in Tables 3 to 6, the difference in capacitance significantly deviates from a tolerance range, ±5% of 10 pF, if the dimensional difference in processing is 1 μm or more, in which a thin-film capacitor includes a dielectric thin-film having a specific inductive capacity of 1,000 and has the same interelectrode distance as that of a thin-film capacitor including a dielectric thin-film having a specific inductive capacity of 2.5 or 4. Also, the difference in capacitance is inside the tolerance range if the dimensional difference in processing is 5 μm or less, in which a thin-film capacitor includes a dielectric thin-film having a specific inductive capacity of 1,000 and has the same electrode area as that of a capacitor including a dielectric thin-film having a specific inductive capacity of 4. However, miniaturization of such a capacitor is difficult because an interelectrode distance is 80 μm or more.

On the other hand, as shown in Tables 3 and 4, the difference in capacitance is inside the tolerance range if the dimensional difference in processing is 5 μm or less, in which a capacitor comprises a dielectric thin-film having a specific inductive capacity of 2.5 or 4. Also, the interelectrode distance of the thin-film capacitor having a specific inductive capacity of 4 is 1/27 in comparison with that of the thin-film capacitor having a specific inductive capacity of 1,000, wherein the electrode area of both thin-film capacitors is the same.

Accordingly, the difference in capacitance caused by the dimensional difference in processing is reduced, and miniaturization and thinning of a capacitor is possible if the specific inductive capacity of the dielectric thin-film is 4 or less.

Example 4

Figure 12:
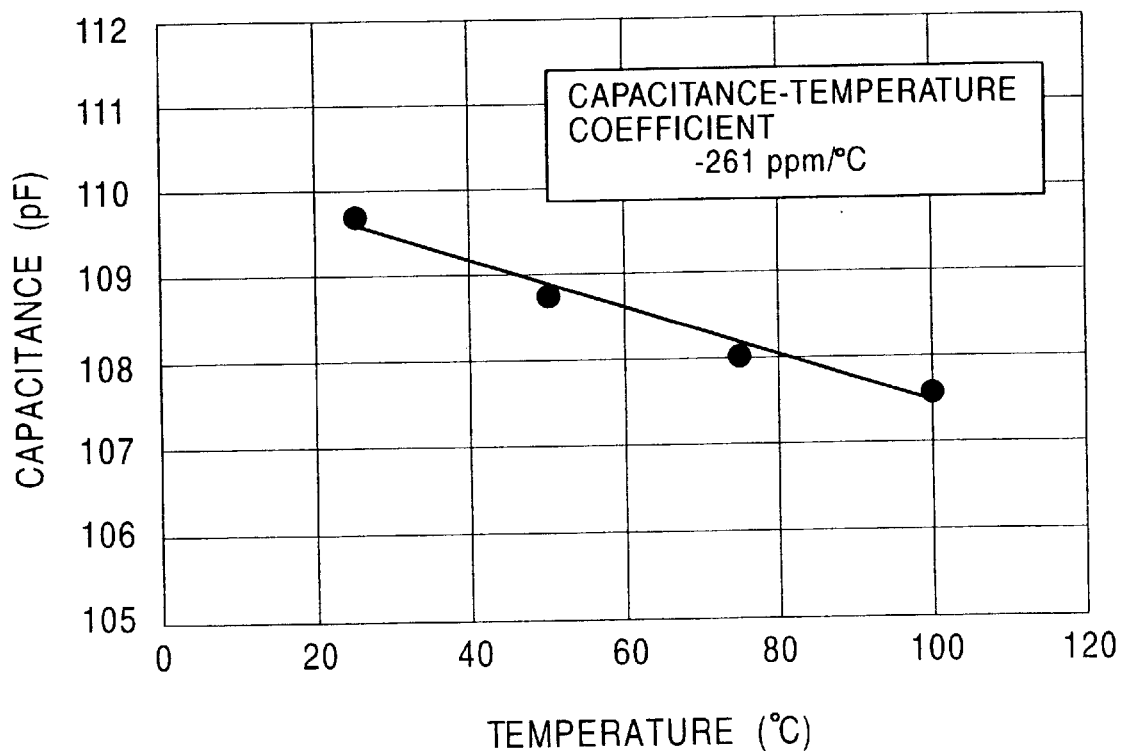
FIG. 12 is a graph showing the relationship between temperature and the capacitance of the thin-film capacitor prepared in Example 4.

A thin-film capacitor was prepared according to the procedure described below. The thin-film capacitor had a first and a second dielectric thin-film placed between electrode layers and had a multilayer structure. A capacitance-temperature coefficient, a Q factor at 1 GHz, and a dielectric strength of a thin-film capacitor were measured. The capacitance-temperature coefficient was determined according to the slope of the plot of a capacitance (pF) versus temperature (° C.) varied in the range of 20 to 100° C., as in FIG. 12.

The thin-film capacitor was prepared as follows. A copper lower electrode having a thickness of 1,500 nm (15,000 Å) was deposited on an alumina or glass substrate by sputtering, and then the SiN$_x$ second dielectric thin-film having a thickness of 150 nm (1,500 Å) was deposited on the lower electrode by PECVD.

Next, a solution which contains mesitylene as a solvent and divinylsiloxane-bis-benzocyclobutene having formula (II) below was applied onto the second dielectric thin-film by a spin coat method, and then the applied film was cured by (1) curing at 50° C. for 2 minutes, (2) curing at 110° C. for 2 minutes, and (3) curing at 250° C. for 10 minutes, if necessary. The polymer film of divinylsiloxane-bis-benzocyclobutene having a thickness of 150 nm (1,500 Å) was provided thereby.

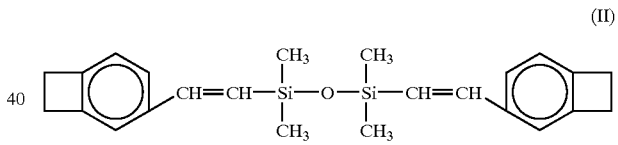

(II)

Subsequently, a photoresist pattern was formed on the polymer film of the second dielectric thin-film by photoresist-coating, pre-baking, exposing, developing, and post-baking; the first dielectric thin-film and the second dielectric thin-film were continuously etched with SF$_6$ or CF$_4$ by a single process; and then the photoresist was removed. Finally, a copper upper electrode layer having a thickness of 1,500 nm (15,000 Å) was formed on the first dielectric thin-film by sputtering at room temperature. The dielectric thin-film having a multilayer structure was provided thereby. The thin-film capacitor having a multilayer structure had a Q factor of 100 at a frequency of 1 GHz, a dielectric strength of 150 V or more, and a capacitance-temperature coefficient of −261 ppm/° C.

The SiN$_x$ second dielectric thin-film had a linear thermal expansion coefficient of 3 ppm/° C. and a specific inductive capacity of 7.0. Also, the thin-film capacitor had a Q factor of 200 at a frequency of 1 GHz when only the second dielectric thin-film was formed between the electrode layers. The first dielectric thin-film composed of the benzocyclobutene polymer had a linear thermal expansion coefficient of 52 ppm/° C. and a specific inductive capacity of 2.7. Also, the thin-film capacitor had a capacitance-temperature coefficient of −380 ppm/° C. and a Q factor of 250 at a frequency of 1 GHz when only the first dielectric thin-film was formed between the electrode layers.

The above result shows that the thin-film capacitor having a capacitance-temperature coefficient of −261 ppm/° C. is provided when the capacitor has the second dielectric thin-film composed of $SiN_x$ and the first dielectric thin-film composed of the benzocyclobutene polymer which are both placed between electrodes. Accordingly, the thin-film capacitor of this example is applicable to a temperature-compensating circuit of a varactor diode having a positive capacitance-temperature coefficient because the capacitor has a negative capacitance-temperature coefficient.

Also, the capacitor of this example has a Q factor of 100 or more, which is a large factor.

Example 5

Figure 13:
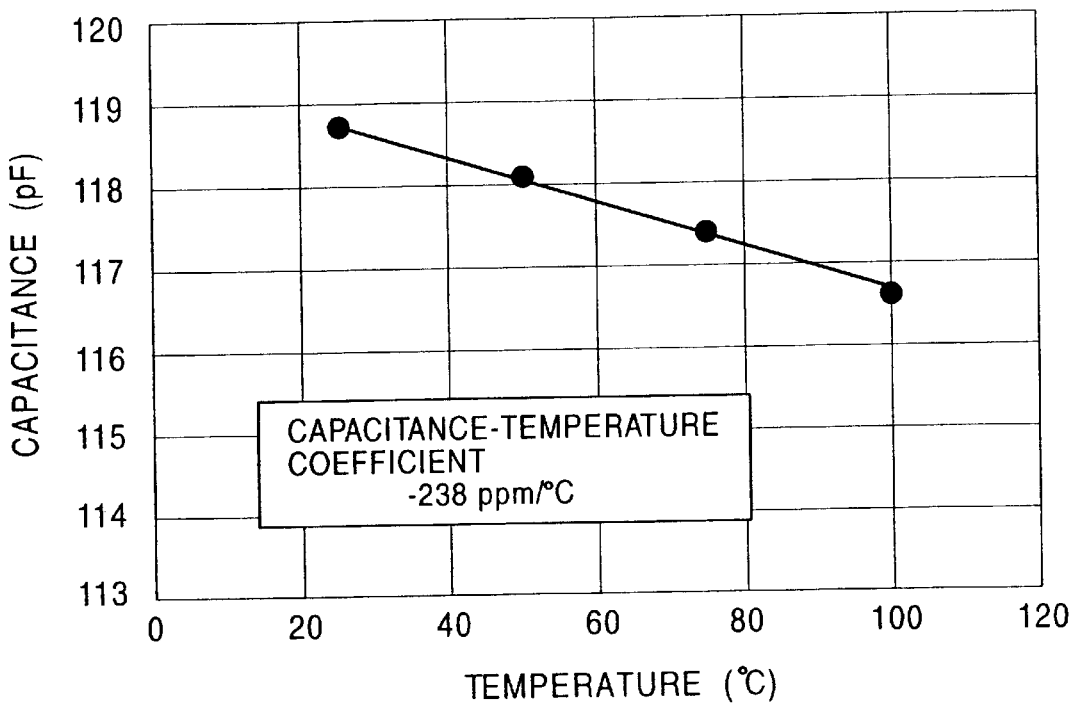
FIG. 13 is a graph showing the relationship between temperature and the capacitance of the thin-film capacitor prepared in Example 5.

A thin-film capacitor was prepared according to the procedure described below. The thin-film capacitor had a first and a second dielectric thin-film placed between electrode layers and had a multilayer structure. A capacitance-temperature coefficient, a Q factor at 1 GHz, and a dielectric strength of a thin-film capacitor were measured. The capacitance-temperature coefficient was determined according to the slope of the plot of a capacitance (pF) versus temperature (° C.) varied in the range of 20 to 100° C., as in FIG. 13.

The thin-film capacitor was prepared as follows. A copper lower electrode having a thickness of 1,500 nm (15,000 Å) was deposited on an alumina or glass substrate by sputtering, and then the $SiN_x$ second dielectric thin-film having a thickness of 150 nm (1,500 Å) was deposited on the lower electrode by PECVD.

Next, a solution which contains mesitylene as a solvent and divinylethyl-bis-naphthocyclobutene having formula (III) below was applied onto the second dielectric thin-film by a spin coat method, and then the applied film was cured by (1) curing at 50° C. for 2 minutes, (2) curing at 110° C. for 2 minutes, and (3) curing at 250° C. for 10 minutes, if necessary. The polymer film of divinylethyl-bis-naphthocyclobutene having a thickness of 150 nm (1,500 Å) was provided thereby.

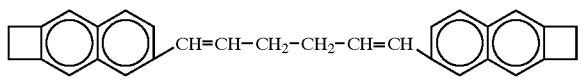
(III)

Subsequently, a photoresist pattern was formed on the polymer film of the second dielectric thin-film by photoresist-coating, pre-baking, exposing, developing, and post-baking; the first dielectric thin-film and the second dielectric thin-film were continuously etched with $SF_6$ or $CF_4$ by a single process; and then the photoresist was removed. Finally, a copper upper electrode layer having a thickness of 1,500 nm (15,000 Å) was formed on the first dielectric thin-film by sputtering at room temperature. The dielectric thin-film having a multilayer structure was provided thereby. The thin-film capacitor having a multilayer structure had a Q factor of 100 at a frequency of 1 GHz, a dielectric strength of 150 V or more, and a capacitance-temperature coefficient of −238 ppm/° C.

The second dielectric thin-film composed of $SiN_x$ had a linear thermal expansion coefficient of 3 ppm/° C. and a specific inductive capacity of 7.0. Also, the second dielectric thin-film had a Q factor of 200 at a frequency of 1 GHz when only the second dielectric thin-film was formed between the electrode layers. The first dielectric thin-film composed of the naphthocyclobutene polymer had a linear thermal expansion coefficient of 50 ppm/° C. and a specific inductive capacity of 2.75. Also, the first dielectric thin-film had a capacitance-temperature coefficient of −370 ppm/° C. and a Q factor of 240 at a frequency of 1 GHz when only the first dielectric thin-film was formed between the electrode layers.

The above result shows that a thin-film capacitor having a capacitance-temperature coefficient of −238 ppm/° C. is provided when the capacitor has the second dielectric thin-film composed of $SiN_x$ and the first dielectric thin-film composed of the naphthocyclobutene polymer which are both placed between electrodes. Accordingly, the thin-film capacitor of this example is applicable to a temperature-compensating circuit of a varactor diode having a positive capacitance-temperature coefficient because the capacitor has a negative capacitance-temperature coefficient.

Also, the capacitor of this example has a Q factor of 100 or more, which is a large factor.

Example 6

Figure 14:
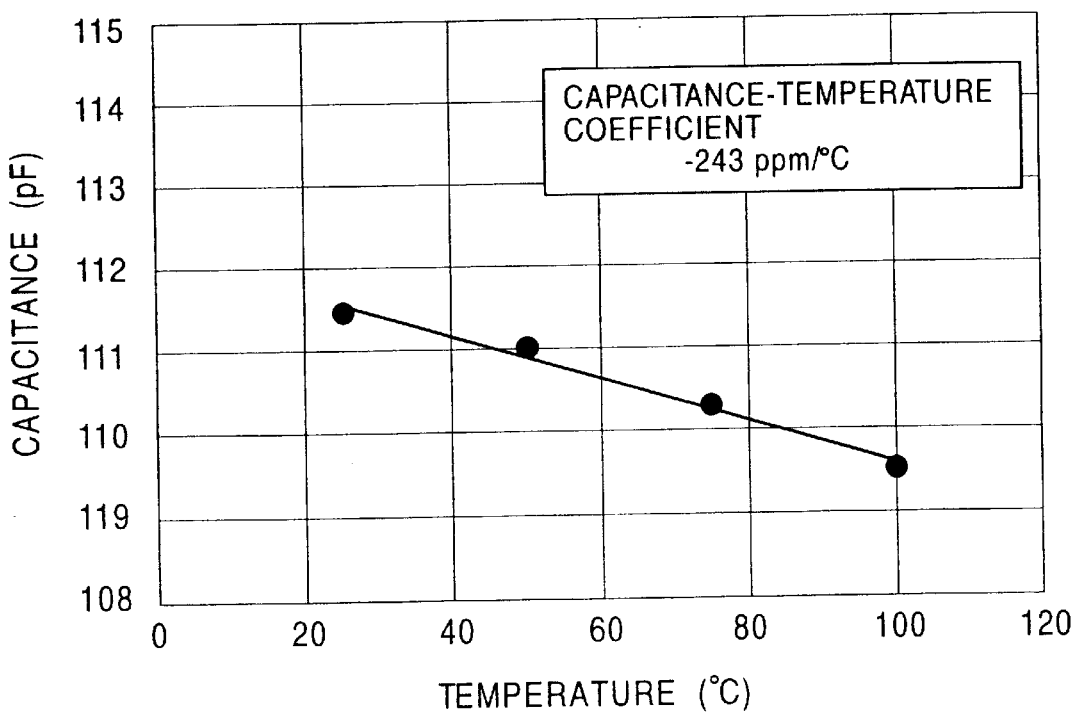
FIG. 14 is a graph showing the relationship between temperature and the capacitance of the thin-film capacitor prepared in Example 6.

A thin-film capacitor was prepared according to the procedure described below. The thin-film capacitor had a first and a second dielectric thin-film placed between electrode layers and had a multilayer structure. A capacitance-temperature coefficient, a Q factor at 1 GHz, and a dielectric strength of a thin-film capacitor were measured. The capacitance-temperature coefficient was determined according to the slope of the plot of a capacitance (pF) versus temperature (° C.) varied in the range of 20 to 100° C., as in FIG. 14.

The thin-film capacitor was prepared as follows. A copper lower electrode having a thickness of 1,500 nm (15,000 Å) was deposited on an alumina or glass substrate by sputtering, and then the $SiN_x$ second dielectric thin-film having a thickness of 150 nm (1,500 Å) was deposited on the lower electrode by PECVD.

Next, a solution which contains mesitylene as a solvent and divinylsiloxane-bis-naphthocyclobutene having formula (IV) below was applied onto the second dielectric thin-film by a spin coat method, and then the applied film was cured by (1) curing at 50° C. for 2 minutes, (2) curing at 110° C. for 2 minutes, and (3) curing at 250° C. for 10 minutes, if necessary. The polymer film of divinylethyl-bis-naphthocyclobutene having a thickness of 150 nm (1,500 Å) was provided thereby.

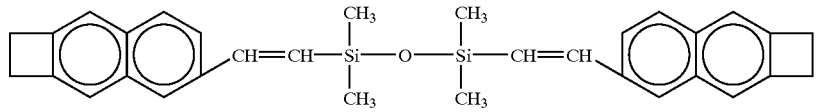
(IV)

Subsequently, a photoresist pattern was formed on the polymer film of the second dielectric thin-film by photoresist-coating, pre-baking, exposing, developing, and post-baking; the first dielectric thin-film and the second dielectric thin-film were continuously etched with $SF_6$ or $CF_4$ by a single process; and then the photoresist was removed. Finally, a copper upper electrode layer having a thickness of 1,500 nm (15,000 Å) was formed on the first dielectric thin-film by sputtering at room temperature. The dielectric thin-film having a multilayer structure was provided thereby. The thin-film capacitor having a multilayer structure had a Q factor of 100 at a frequency of 1 GHz, a dielectric strength of 150 V or more, and a capacitance-temperature coefficient of −243 ppm/° C.

The second dielectric thin-film composed of $SiN_x$ had a linear thermal expansion coefficient of 3 ppm/° C. and a specific inductive capacity of 7.0. Also, the second dielectric thin-film had a Q factor of 200 at a frequency of 1 GHz when only the second dielectric thin-film was formed between the electrode layers. The first dielectric thin-film composed of the naphthocyclobutene polymer had a linear thermal expansion coefficient of 50 ppm/° C. and a specific inductive capacity of 2.8. Also, the first dielectric thin-film had a capacitance-temperature coefficient of −373 ppm/° C. and a Q factor of 230 at a frequency of 1 GHz when only the first dielectric thin-film was formed between the electrode layers.

The above result shows that a thin-film capacitor having a capacitance-temperature coefficient of −243 ppm/° C. is provided when the capacitor has the second dielectric thin-film composed of $SiN_x$ and the first dielectric thin-film composed of the naphthocyclobutene polymer which are both placed between electrodes. Accordingly, the thin-film capacitor of this example is applicable to a temperature-compensating circuit of a varactor diode having a positive capacitance-temperature coefficient because the capacitor has a negative capacitance-temperature coefficient.

Also, the capacitor of this example has a Q factor of 100 or more, which is a large factor.

What is claimed is:

1. A temperature-compensating thin-film capacitor comprising:
    a dielectric thin-film which has a specific inductive capacity of 4.0 or less and a linear thermal expansion coefficient of 25 ppm/° C. or more, and which is placed between a pair of electrodes,
    wherein the dielectric thin-film contains a cyclic polymer of perfluorodivinyl ether.

2. A temperature-compensating thin-film capacitor according to claim 1, wherein the capacitor has a Q factor of 100 or more at a frequency of 1 GHz or more.

3. A temperature-compensating thin-film capacitor according to claim 1, wherein a capacitance-temperature coefficient is negative.

4. A temperature-compensating thin-film capacitor according to claim 3, wherein the absolute value of the capacitance-temperature coefficient is 200 ppm/° C. or more.

5. A temperature-compensating thin-film capacitor according to claim 4, wherein the dielectric thin-film has a protective coating which is deposited thereon, the protective coating covering at least part of the dielectric thin-film.

6. A temperature-compensating thin-film capacitor comprising:
    a dielectric thin-film which has a specific inductive capacity of 4.0 or less and a linear thermal expansion coefficient of 25 ppm/° C. or more, and which is placed between a pair of electrodes,
    wherein the dielectric thin-film contains one of a benzocyclobutene polymer and a naphthocyclobutene polymer as a main component.

7. A temperature-compensating thin-film capacitor according to claim 6, wherein the polymer has a benzocyclobutene group or a naphthocyclobutene group and an ethylene group in the molecular structure.

8. A temperature-compensating thin-film capacitor according to claim 6, wherein the polymer has a benzocyclobutene group or a naphthocyclobutene group, an ethylene group, and a siloxane bond in the molecular structure.

9. A temperature-compensating thin-film capacitor comprising:
    a first dielectric thin-film which has a specific inductive capacity of 4.0 or less and a linear thermal expansion coefficient of 50 ppm/° C. or more; and
    a second dielectric thin-film which has an absolute value of a capacitance-temperature coefficient of 50 ppm/° C. or less,
    wherein the first dielectric thin-film and the second dielectric thin-film are placed between a pair of electrodes.

10. A temperature-compensating thin-film capacitor according to claim 9, wherein the first dielectric thin-film contains a fluoric polymer as a main component.

11. A temperature-compensating thin-film capacitor according to claim 10, wherein the second dielectric thin-film is deposited on the first dielectric thin-film.

12. A temperature-compensating thin-film capacitor according to claim 10, wherein the first dielectric thin-film is deposited on the second dielectric thin-film and has a protective coating which is deposited onto the first dielectric thin-film, the protective coating covering at least part of the first dielectric thin-film.

13. A temperature-compensating thin-film capacitor according to claim 9, wherein the first dielectric thin-film contains one of a benzocyclobutene polymer and a naphthocyclobutene polymer as a main component.

14. An electronic device comprising a temperature-compensating thin-film capacitor according to claim 1.

15. An electronic device comprising a temperature-compensating thin-film capacitor according to claim 9.

16. An electronic device comprising a temperature-compensating thin-film capacitor according to claim 6.

* * * * *